US012767063B2

(12) United States Patent
Arsenault

(10) Patent No.: US 12,767,063 B2
(45) Date of Patent: Oct. 20, 2026

(54) QUICK INSTALL TABLET SUPPORT

(71) Applicant: Isaac Instruments inc., St-Bruno-de-Montarville (CA)

(72) Inventor: David Arsenault, Saint-Bruno-de-Montarville (CA)

(73) Assignee: Isaac Instruments inc., St-Bruno-de-Montarville (CA)

( * ) Notice: Subject to any disclaimer, the term of this patent is extended or adjusted under 35 U.S.C. 154(b) by 45 days.

(21) Appl. No.: 18/943,253

(22) Filed: Nov. 11, 2024

(65) Prior Publication Data

US 2025/0153655 A1 May 15, 2025

Related U.S. Application Data

(60) Provisional application No. 63/547,899, filed on Nov. 9, 2023.

(51) Int. Cl.
*B60R 11/02* (2006.01)
*B60R 11/00* (2006.01)

(52) U.S. Cl.
CPC ... *B60R 11/0252* (2013.01); *B60R 2011/0005* (2013.01); *B60R 2011/0059* (2013.01); *B60R 2011/0085* (2013.01)

(58) Field of Classification Search
CPC ......... B60R 11/0252; B60R 2011/0005; B60R 2011/0059; B60R 2011/0085
USPC ............ 248/454, 444, 447.1, 447.2; 224/483
See application file for complete search history.

(56) References Cited

U.S. PATENT DOCUMENTS 4,383,626 A * 5/1983 Weinblatt ............ B60R 11/0211 224/540
6,092,705 A * 7/2000 Meritt ................. B60R 11/0211 296/37.16
6,097,448 A * 8/2000 Perkins ............... B60R 11/0229 383/22
6,098,860 A * 8/2000 Phillips .................. B60N 3/103 224/560
6,349,916 B1 * 2/2002 Lang ..................... B60R 1/0617 248/478
6,932,309 B1 * 8/2005 Corey ................. B60R 11/0241 24/130
8,276,863 B2 * 10/2012 Niwai ................. B60R 11/0252 224/555
9,108,575 B2 * 8/2015 Preston ................... B60R 11/02
RE47,085 E * 10/2018 Newman ................ F16M 11/14
10,093,244 B1 * 10/2018 Brown .................... B60R 11/00
10,343,612 B1 * 7/2019 Allred ..................... B60R 7/043
10,348,877 B1 * 7/2019 Von Borstel ........... B60K 35/50
10,486,606 B1 * 11/2019 Stabile ...................... B60R 7/08
(Continued)

*Primary Examiner* — Muhammad Ijaz
(74) *Attorney, Agent, or Firm* — Decode Legal Inc.; Charles-Andre Caron

(57) ABSTRACT

A tablet support is adapted to be mounted on the dashboard of a vehicle. The tablet support has a base; straps adapted to secure the base to the vehicle; and an articulated arm assembly. The articulated arm assembly consists of a first arm and a second arm articulated relative to one another, with the first arm having a first face and a second face, and the second arm having a tablet interface assembly integrated or mounted thereto. The articulated arm assembly can be mounted to the base either with its first face or its second face against the base, thereby allowing to position the tablet interface assembly lower or higher than the base.

20 Claims, 16 Drawing Sheets

(56) References Cited

U.S. PATENT DOCUMENTS

| | | | | |
|---|---|---|---|---|
| 11,203,306 | B2 | 12/2021 | Hodge | |
| 11,932,205 | B1 * | 3/2024 | Rohaly, Jr. | B60N 3/002 |
| 2003/0038149 | A1 * | 2/2003 | Purpura | B60R 11/0252 224/560 |
| 2003/0075458 | A1 * | 4/2003 | Ma | A45C 3/02 206/701 |
| 2012/0175394 | A1 * | 7/2012 | Keune | F16M 13/04 24/3.1 |
| 2012/0223196 | A1 * | 9/2012 | Musselman | B60R 11/02 248/220.21 |
| 2013/0214114 | A1 * | 8/2013 | Gruber | F16M 11/22 248/463 |
| 2014/0166712 | A1 * | 6/2014 | Pickett | B60R 7/14 224/483 |
| 2015/0048131 | A1 * | 2/2015 | Preston | B60R 11/02 224/483 |
| 2017/0250717 | A1 * | 8/2017 | Beauregard | H04B 1/3822 |
| 2017/0355408 | A1 | 12/2017 | Levy | |
| 2018/0170273 | A1 * | 6/2018 | Mea | A45F 5/00 |
| 2018/0186267 | A1 * | 7/2018 | Cressy | B60N 3/08 |
| 2019/0084492 | A1 * | 3/2019 | Bowles | B60R 9/10 |
| 2025/0153655 | A1 * | 5/2025 | Arsenault | B60R 11/0252 |
| 2025/0326354 | A1 * | 10/2025 | Mestauskas | B60N 2/0029 |

* cited by examiner

SECTION B-B

SECTION A-A

SECTION B-B

SECTION A-A

QUICK INSTALL TABLET SUPPORT

CROSS-REFERENCE TO RELATED APPLICATION

This application claims benefit from U.S. provisional patent application US 63/547,899, filed Nov. 9, 2023, entitled QUICK INSTALL TABLET SUPPORT, the specification of which is hereby incorporated herein by reference in its entirety.

BACKGROUND

(a) Field

The subject matter disclosed generally relates to a device and a method for mounting temporarily a device, and more particularly a tablet. More particularly, the subject matter disclosed relates to a device and a method for temporarily mounting an electronic tablet to a vehicle dash.

(b) Related Prior Art

In the field of vehicles, many mounting devices have been developed to releasable mount a display device such as phone or tablet to the dashboard of the vehicle. Most of them provide non-reliable anchoring to the display device. With the use of larger display devices such as tablets, there is more need for a stable support, furthermore if the use of the display device involves the use of the touch screen for data entry, such as for delivery vehicles.

There is therefore a need for improvement in tablet supports for vehicles that are adapted for the specific needs associated with e.g., delivery vehicles.

SUMMARY

In some aspects, the description herein relates to a tablet support to be mounted on a surface of a vehicle, including: a base; straps adapted to secure the base to the vehicle; and an articulated arm assembly including a first arm, and a second arm articulated relative to one another, with the first arm including a first face and a second face, and the second arm including a tablet interface assembly; wherein the articulated arm assembly is adapted to be mounted to the base either with its first face or its second face against the base, and wherein, by securing the first face or the second face of the first arm to the base, the tablet interface assembly can be positioned in a first position or in a second position while facing away to the base.

In some aspects, the description herein relates to a tablet support, further including a pad, wherein the straps are adapted to secure the base on top of the pad, thereby having the pad wedged between the base and the surface.

In some aspects, the description herein relates to a tablet support, wherein an interface between the first face and the base defines a first plane, and wherein the articulated arm assembly includes an articulation axis around which rotates the second arm that is parallel to the first plane.

In some aspects, the description herein relates to a tablet support, wherein the articulated arm assembly includes a pair of contact walls interfacing rotatably with one another, and means to releasably exert pressure that wedges the contact walls against one another, thereby adapted to set the contact walls in a plurality of angular positions relative to one another.

In some aspects, the description herein relates to a tablet support, wherein the contact walls include teeth and recesses.

In some aspects, the description herein relates to a tablet support, wherein the first arm is adapted to be mounted to the base by securing the first arm to the base using a releasable securing means.

In some aspects, the description herein relates to a tablet support, wherein the first arm is adapted to be mounted to the base in a plurality of positions regardless of which one of the first face and the second face of the first arm is mounted against the base.

In some aspects, the description herein relates to a tablet support, wherein the tablet interface assembly includes an interface component mounted to the second arm and a tablet holding component adapted to hold a tablet, the tablet interface assembly including a protrusion and a recess that are adapted to be combined to releasably mount the tablet holding component to the interface component.

In some aspects, the description herein relates to a tablet support, wherein the protrusion has a non-circular first shape, and the recess has a second shape that allows to insert the protrusion in the recess in a plurality of positions.

In some aspects, the description herein relates to a tablet support, where the base includes a plurality of slots, wherein at least one of the straps include a hook adapted to be inserted in one of the slots.

In some aspects, the description herein relates to a tablet support to be mounted on a surface of a vehicle, including: a base; straps adapted to secure the base to the vehicle; and an arm assembly including a first arm and a second arm that are adapted to be in a first position in which the first arm and the second arm have a first angle greater than 45 degrees in-between, with the first arm including a first face and a second face, and the second arm including a tablet interface assembly; wherein the arm assembly is adapted to be mounted to the base either with its first face or its second face against the base, thereby adjusting position of the tablet interface assembly relative to the base.

In some aspects, the description herein relates to a tablet support, further including a pad, wherein the straps are adapted to secure the base on top of the pad, thereby having the pad wedged between the base and the surface.

In some aspects, the description herein relates to a tablet support, wherein the arm assembly is an articulated arm assembly that includes an articulation axis around which rotates the second arm, wherein the second arm as an end distant to the articulation axis allowing, wherein the end is adapted to be moved between a first position and a second position closer to the base than the first position.

In some aspects, the description herein relates to a tablet support, wherein the articulated arm assembly includes a pair of contact walls interfacing rotatably with one another, and means to releasably exert pressure that wedges the contact walls against one another, thereby adapted to set the contact walls in a plurality of angular positions relative to one another.

In some aspects, the description herein relates to a tablet support, wherein the contact walls include teeth and recesses.

In some aspects, the description herein relates to a tablet support, wherein the first arm is adapted to be mounted to the base by securing the first arm to the base using a releasable securing means.

In some aspects, the description herein relates to a tablet support, wherein the first arm is adapted to be mounted to the base in a plurality of positions regardless of which one of the first face and the second face of the first arm being mounted against the base.

In some aspects, the description herein relates to a tablet support, wherein the tablet interface assembly includes an interface component mounted to the second arm and a tablet holding component adapted to hold a tablet, the tablet interface assembly including a protrusion and a recess that are adapted to be combined to releasably mount the tablet holding component to the interface component.

In some aspects, the description herein relates to a tablet support, wherein the protrusion has a non-circular first shape, and the recess has a second shape that allows to insert the protrusion in the recess in a plurality of positions.

In some aspects, the description herein relates to a tablet support, where the base includes a plurality of slots, wherein at least one of the straps include a hook adapted to be inserted in one of the slots.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The realizations will now be described more fully hereinafter with reference to the accompanying figures, in which realizations are illustrated. The foregoing may, however, be embodied in many different forms and should not be construed as limited to the illustrated realizations set forth herein.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words "about", "approximately", or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language ("e.g.," "such as", or the like) provided herein, is intended merely to better illuminate the exemplary realizations and does not pose a limitation on the scope of the realizations. No language in the specification should be construed as indicating any unclaimed element as essential to the practice of the realizations. The use of the term "substantially" is intended to mean "for the most part" or "essentially" depending on the context. It is to be construed as indicating that some deviation from the word it qualifies is acceptable as would be appreciated by one of ordinary skill in the art to operate satisfactorily for the intended purpose.

In the following description, it is understood that terms such as "first", "second", "top", "bottom", "above", "below", and the like, are words of convenience and are not to be construed as limiting terms.

Figure 1:
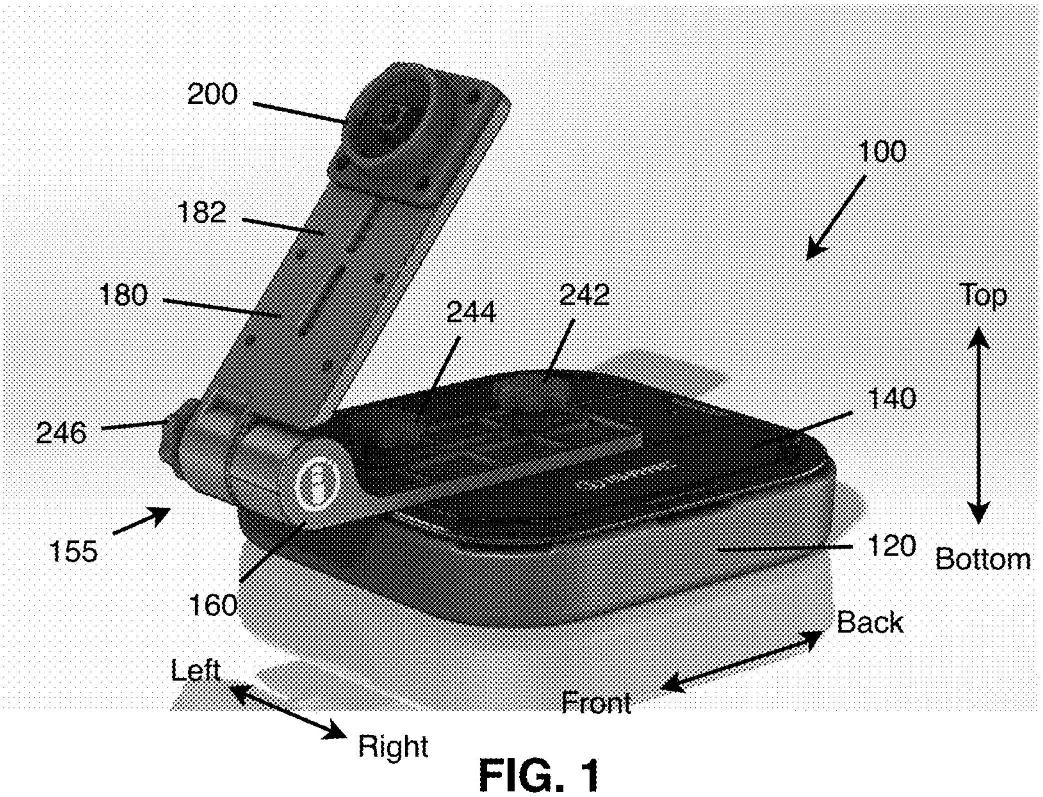
FIG. 1 is a perspective front elevation view of a tablet support with the arm extended upward in accordance with an embodiment.

The terms "top", "up", "upper", "bottom", "lower", "down", "vertical", "horizontal", "interior" and "exterior" and the like are intended to be construed in their normal meaning in relation with normal installation of the tablet support on a dashboard of a vehicle with indication of the orientations being provided on FIG. 1.

It should further be noted that for purposes of this disclosure, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members, or the two members and any additional intermediate members being integrally formed as a single unitary body with one another or with the two members or the two members and any additional intermediate members being attached to one another. Such joining may be permanent in nature or alternatively may be removable or releasable in nature.

Figure 2:
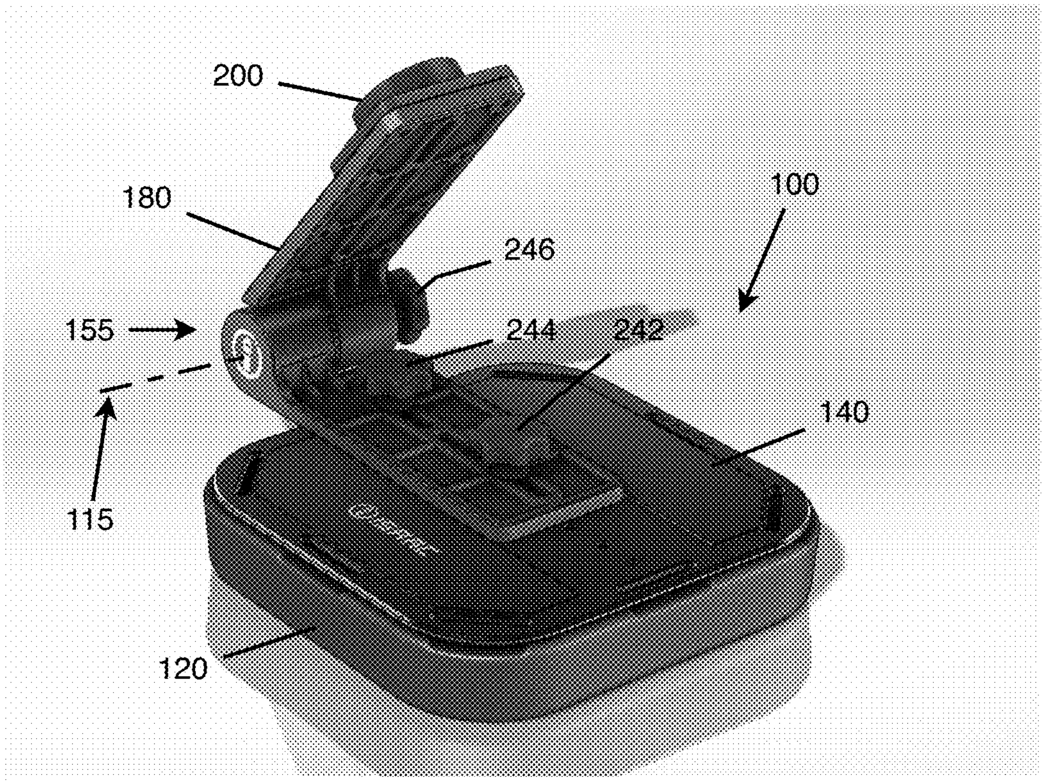
FIG. 2 is a perspective rear elevation view of the tablet support of FIG. 1.
Figure 3:
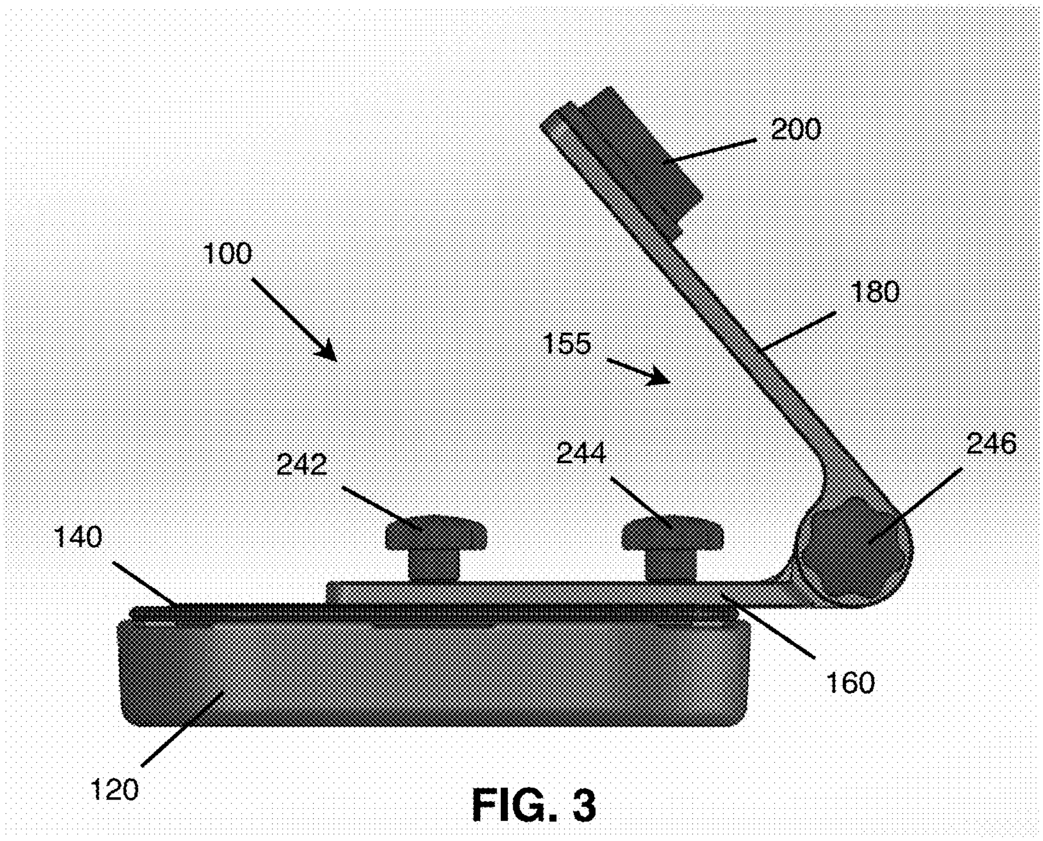
FIG. 3 is a side view of a tablet support of FIG. 1.
Figure 21:
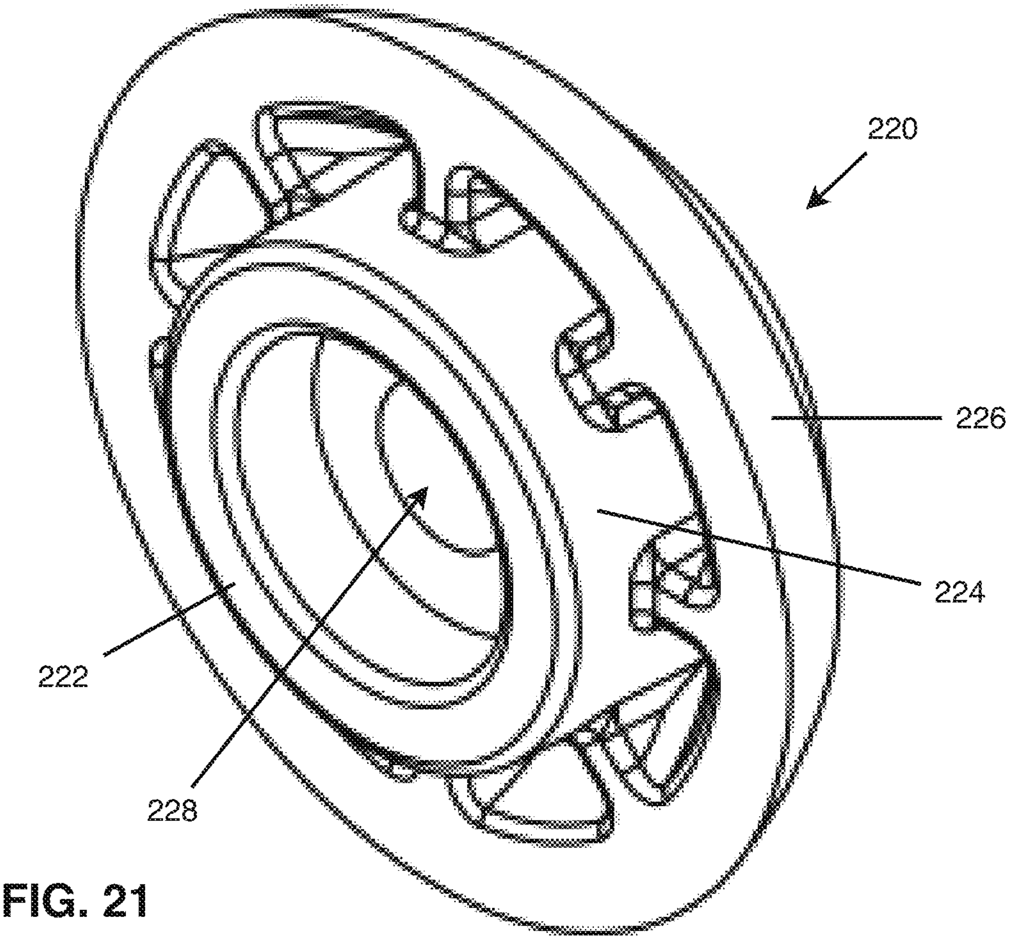
FIG. 21 is a perspective elevation view of interface component in accordance with an embodiment.
Figure 22:
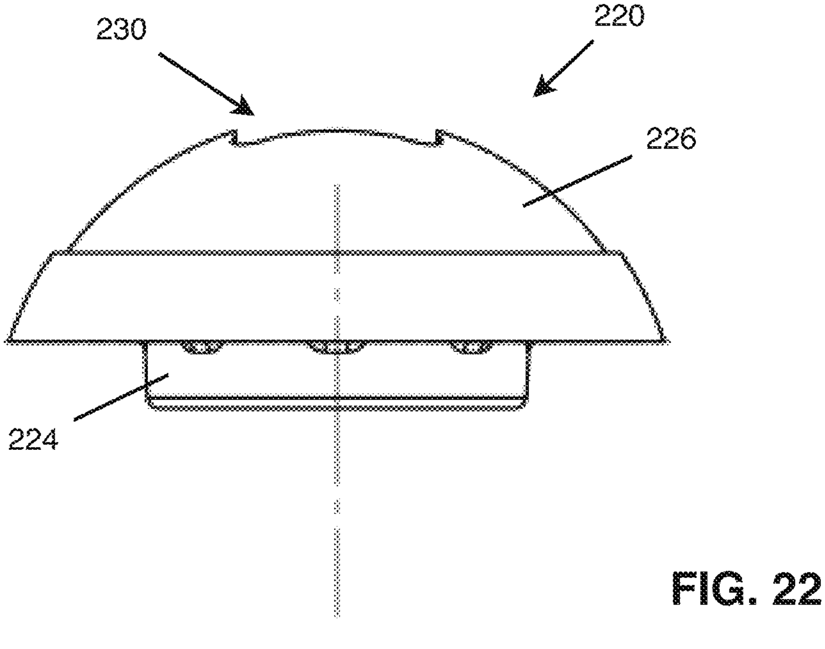
FIG. 22 is a side view of the interface component of FIG. 21.
Figure 23:
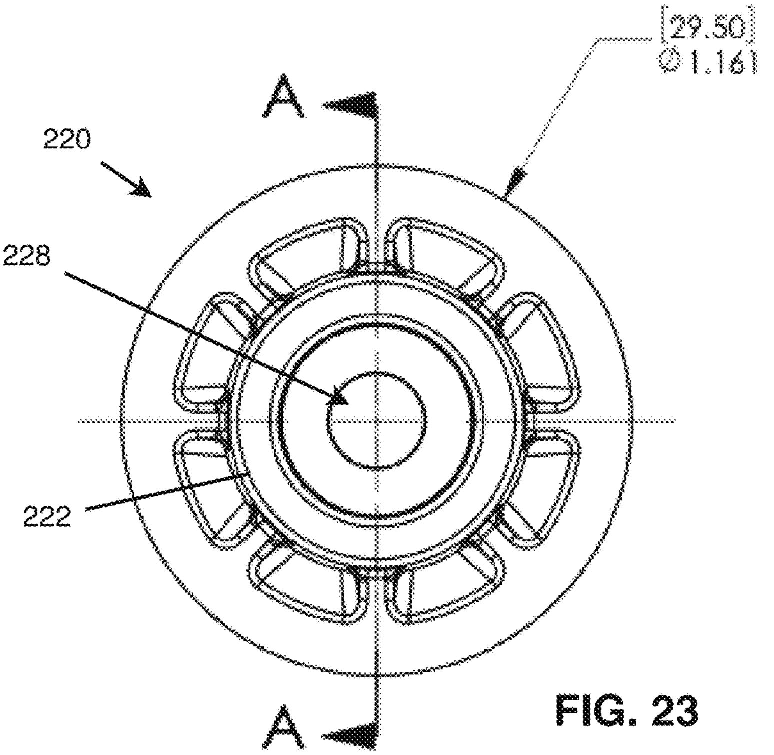
FIG. 23 is a bottom view of the interface component of FIG. 21.
Figure 24:
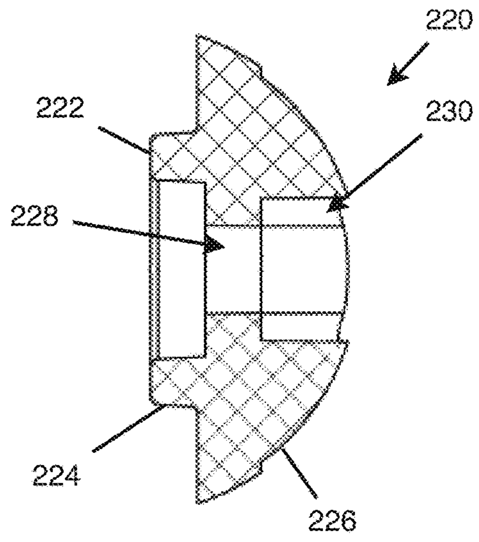
FIG. 24 is a cross-section side view of the interface component of FIG. 21 according to cross-section line A-A depicted on FIG. 23.
Figure 25:
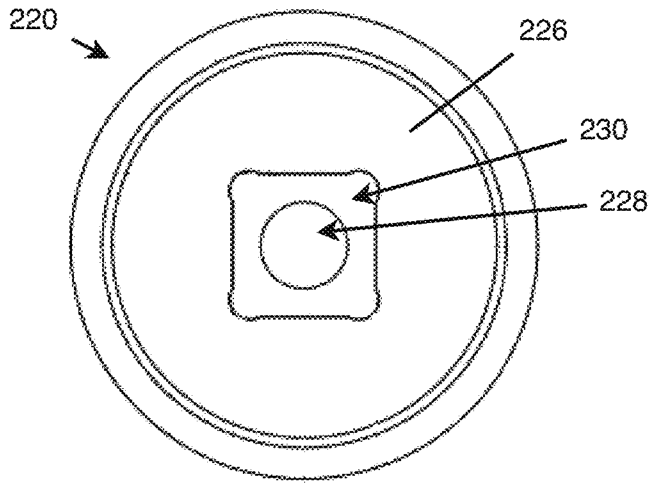
FIG. 25 is an elevation view of the interface component of FIG. 21.

Referring now to the drawings, and more particularly to FIGS. 1 to 3, a tablet support 100 is adapted to be mounted permanently or releasably e.g., to a dashboard of a vehicle. The tablet support 100 comprises a pad 120, a base 140, an articulated arm assembly 155 comprising a first arm 160 and a second arm 180, and a tablet interface assembly 195 (see e.g., FIG. 29) comprising an arm-mounted interface component 200 and an interface component 220 (FIG. 21).

The tablet support 100 is adapted to provide numerous ways to adjust a position and an orientation of a tablet. For example and without limitation, it can be made by a forward/rearward adjustment of the articulated arm assembly 155; by an adjustment of the tablet interface assembly 195 close or distant to the extremity of the second arm 180; by an adjustment of the pitch angle of the second arm 180 relative to the pad 120 between a negative pitch angle (under zero (0) degree), and a positive pitch angle (above 0 degree) where 0 degree corresponds to a position parallel to the base 140. The tablet interface assembly 195 is mounted to the up-facing side of the distant arm portion and to the down-facing side of the second arm 180. Accordingly, users have a lot of freedom in adjustment of the position, e.g., elevation, of the tablet and angle of the tablet.

In a preferred embodiment, the tablet interface assembly 195 provides additional options in the adjustment of the tablet, comprising e.g., adjustment of the orientation of the tablet in a portrait mode or a landscape mode, and an all-around limited pitch adjustment of the tablet allowing the tablet e.g., to face partially sideway without changing the position and orientation of the pad 120.

Still referring to FIGS. 1 to 3, the tablet support 100 comprises a pad 120 adapted to be mounted to e.g., laid over the dashboard of a vehicle, a base 140 mounted to the pad 120, and an articulated arm assembly 155 adjustably mounted to the base 140. The articulated arm assembly 155 comprises a first arm 160 and a second arm 180 rigidly and adjustably mounted to the first arm 160 around the articulation axis 115. The tablet support 100 further comprises an arm-mounted interface component 200, part of the tablet interface assembly 195, adjustably mounted to the second arm 180 of the articulated arm assembly 155. Adjustment screws 242, 244, and 246 comprising and operable with a manual knob are used to adjustably mount the first arm 160 to the base 140 and the pitch angle of the second arm 180 relative to the first arm 160.

A function of the screw 246 is to provide a means to releasably exert pressure that wedges the contact walls 176, 196 against one another for holding (securing) them together, allowing to adjust the pitch when pressure is released. Alternatives structure for performing that function are contemplated therethrough.

In one embodiment, mounting screws are used to mount the tablet interface assembly 195 to the second arm 180.

Still referring to FIGS. 1 to 3, the pitch angle of the second arm 180 is positive, with the second arm 180 extending upward relative to the first arm 160 and the first face 182 of the second arm 180 facing frontward, aka opposed to the pad 120.

Figure 4:
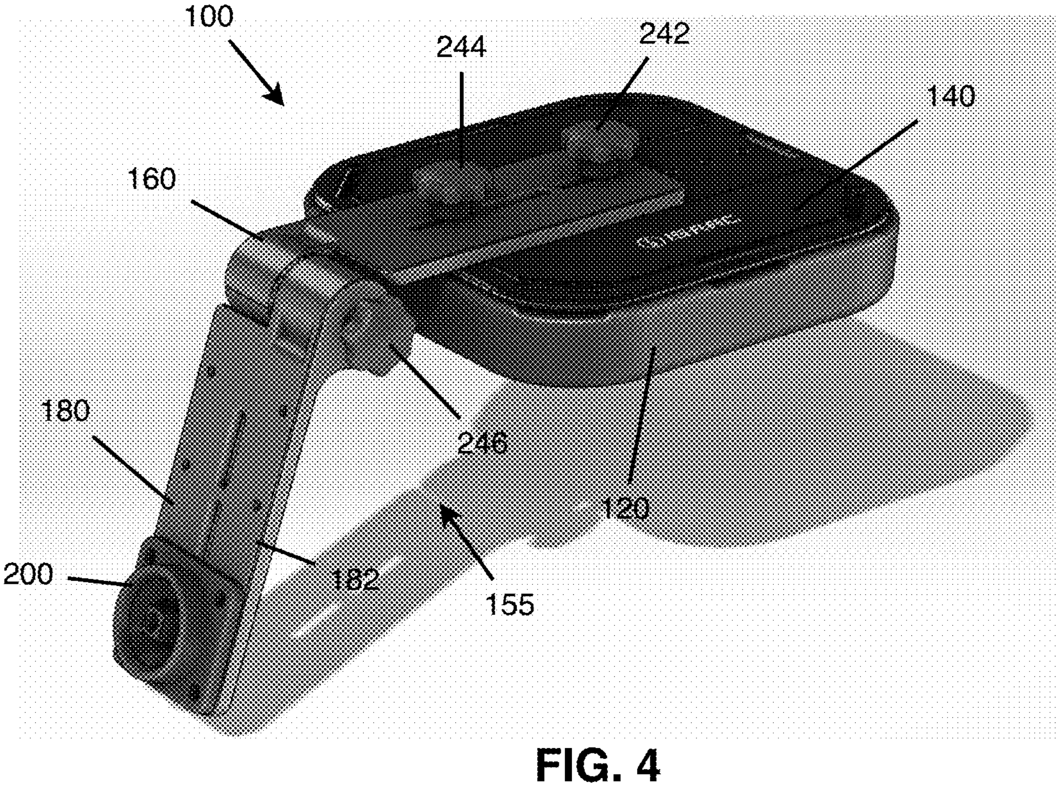
FIG. 4 is a perspective front elevation view of the tablet support of FIG. 1 with the arm extended downwards, with the pad sitting on the top of the dash (not depicted), and the arm is facing in driver-facing direction.
Figure 5:
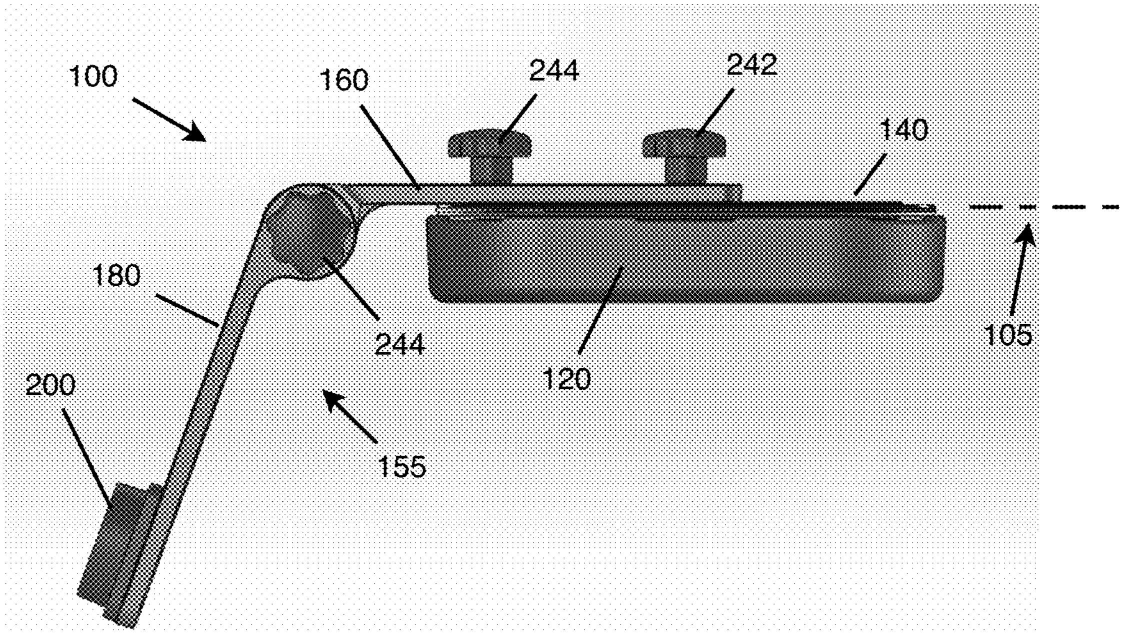
FIG. 5 is a side view of a tablet support of FIG. 4 with the arm extended downwards.

Referring to FIGS. 4 and 5, the articulated arm assembly 155 is reversely mounted to the base 140 along the mounting interface plane 105, the second face of the first arm 160 being mounted to and facing the base 140. In this exemplary configuration, the second arm 180 of the articulated arm assembly 155 extends with a negative pitch angle, aka downwards relative to the pad 120, with the arm-mounted interface component 200 still mounted to the first, flat, face 182 of the second arm 180 still facing frontward. That configuration allows the tablet to be mounted at least partially below the pad 120.

Figure 32:
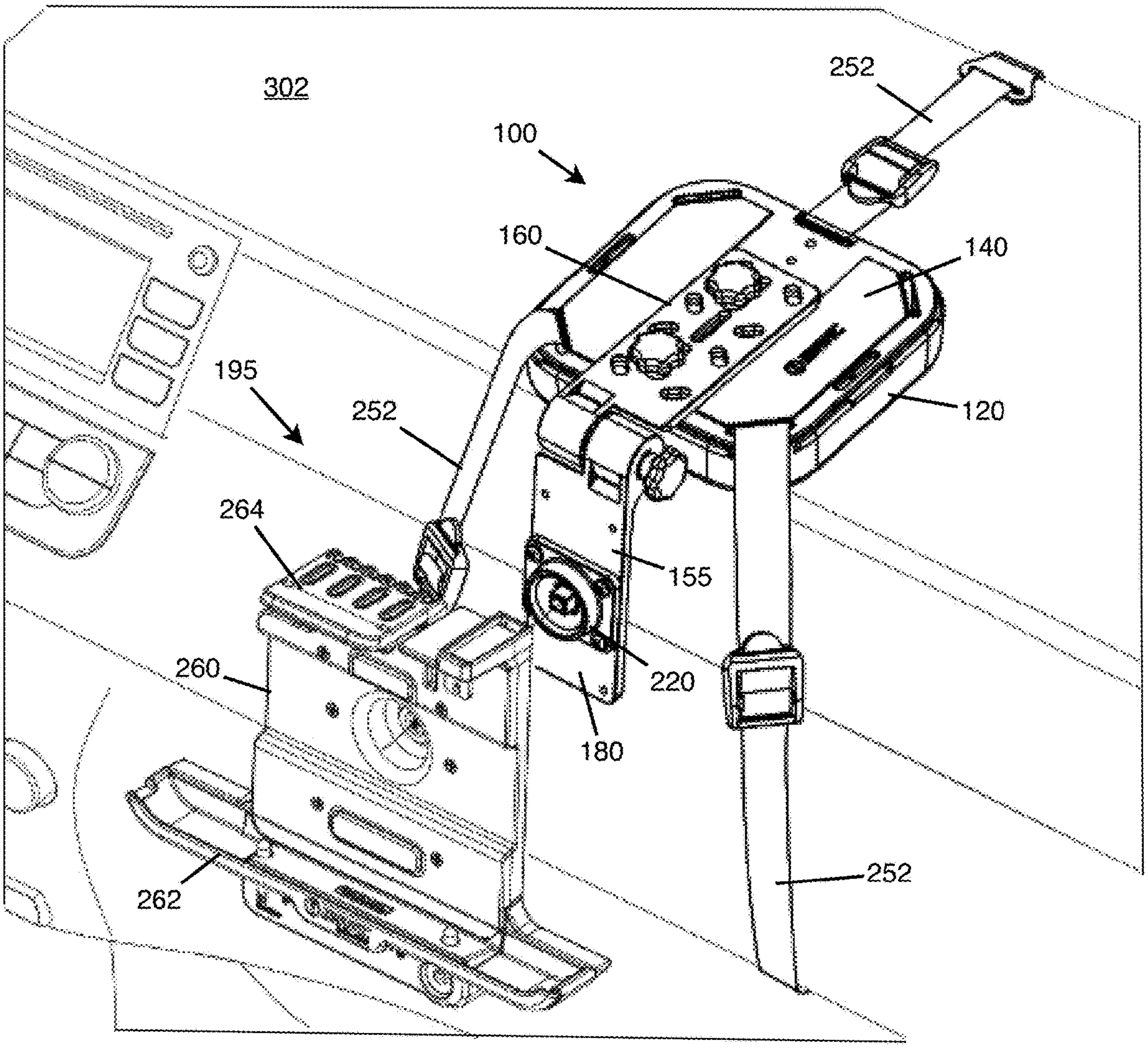
FIG. 32 is a semi-exploded perspective view of an installation of a tablet support installed in a vehicle in accordance with an embodiment.

Referring now to FIGS. 6 to 11, the pad 120 is adapted to be mounted, e.g., screwed and/or glued, to a dashboard 302. Referring also to FIG. 32, the pad 120 is adapted to be mounted, e.g., tied up on to or over the dashboard 302.

The pad 120 comprises a side wall 124, and a bottom wall 126. The pad 120 comprises a series of structural walls 128, e.g., division walls, partition walls or projections, configured to rigidify the pad 120, and a series of mounting holes 130 adapted to having mounting screws mounted thereto to mount the pad 120 to the dashboard. The pad 120 further comprises e.g., on the side wall 124, ridges 132 and depressions 134 designed to ease alignment of the base 140 on the pad 120 and clip the base 140 thereto. Further, the pad 120 (or alternatively the base 140) may further comprise recesses providing additional space for hooks or straps for when the tablet support 100 is mounted by tying up a base 140 to the vehicle, thereby wedging the pad 120 between a mounting surface, e.g., the dashboard 302, and the base 140.

Figure 6:
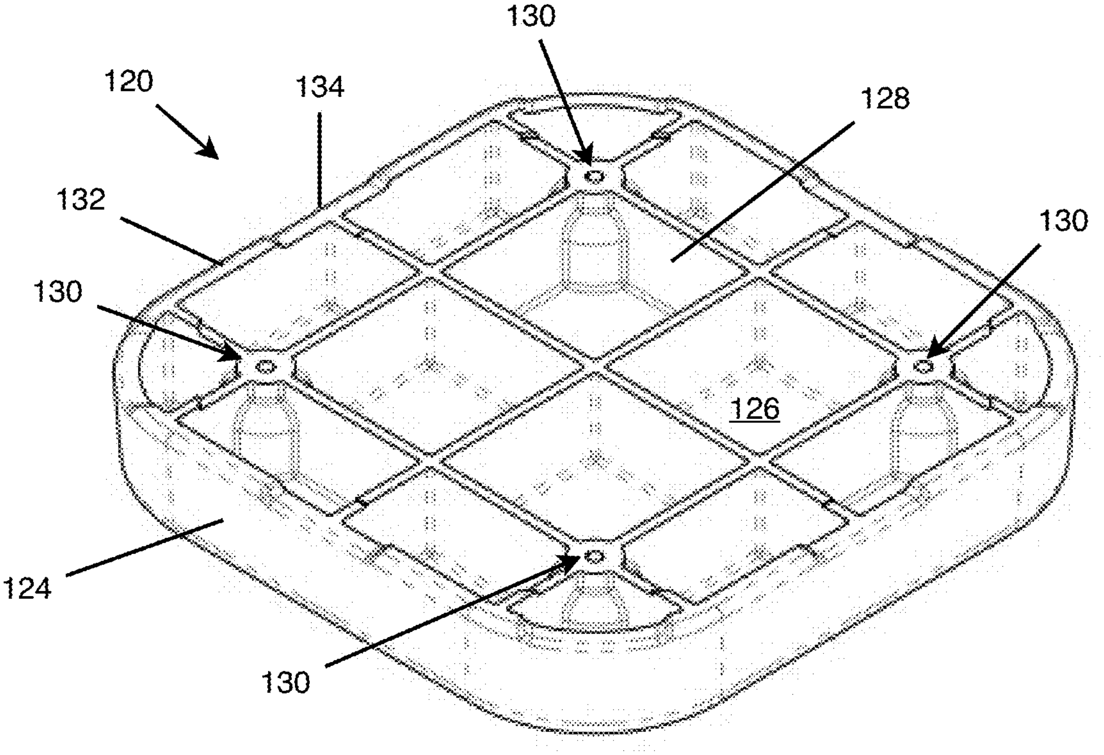
FIG. 6 is a perspective view of the pad of the tablet support of FIG. 1.
Figure 7:
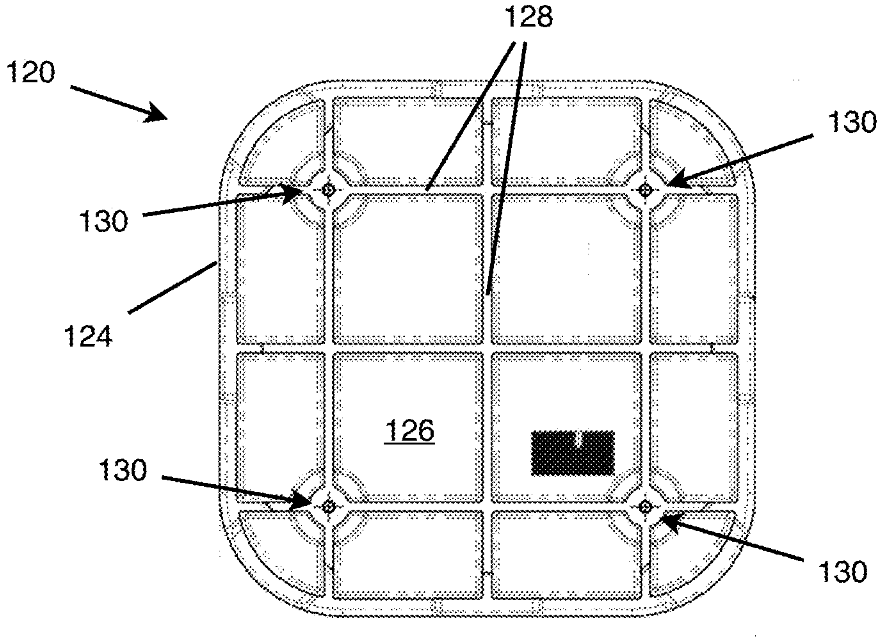
FIG. 7 is an elevation view of the pad of FIG. 6.
Figure 8:
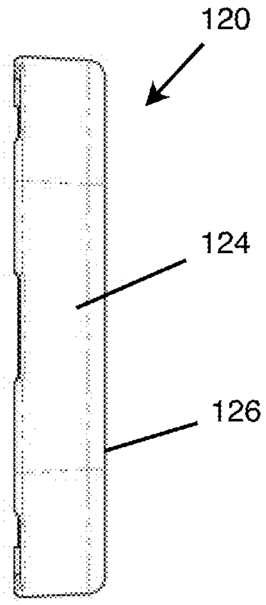
FIG. 8 is a side view of the pad of FIG. 6.
Figure 9:
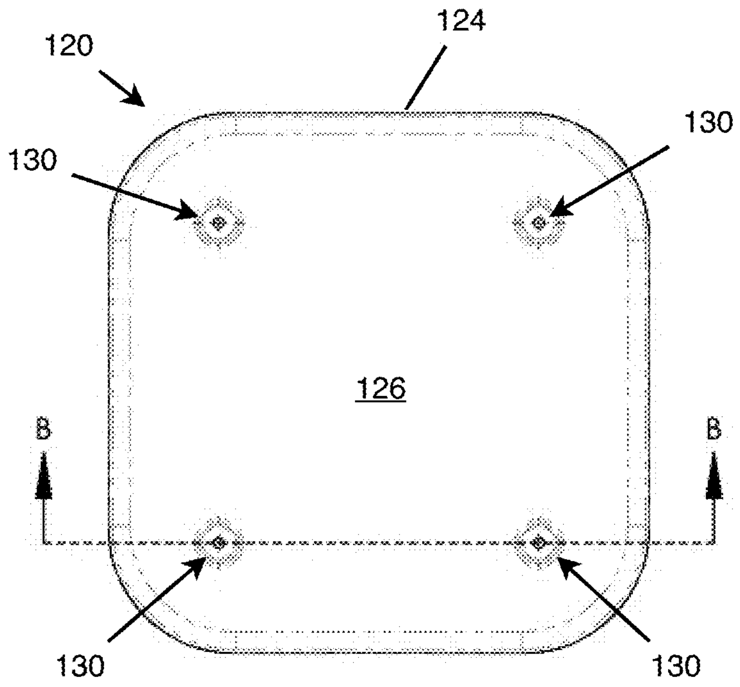
FIG. 9 is a bottom view of the pad of FIG. 6.
Figure 10:
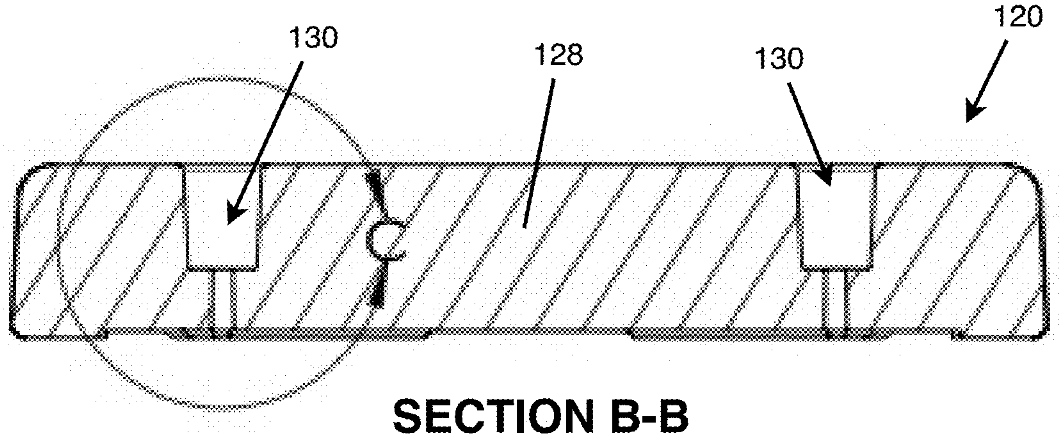
FIG. 10 is a cross-section side view of the pad of FIG. 6 according to cross-section line B-B depicted on FIG. 9.
Figure 11:
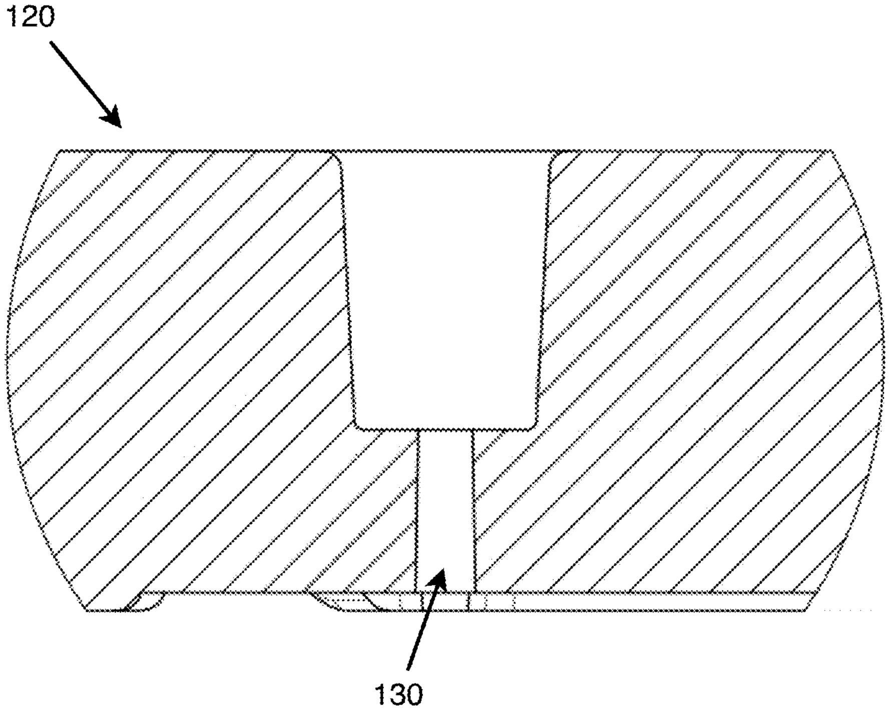
FIG. 11 is a cross-section of a detailed portion of the pad of FIG. 6 according to the line delimiting the detailed portion depicted on FIG. 10.

It is to be noted that according to embodiments, the ridges 132 and depressions 134 may be limited to the top edge of the pad 120, to the top edge of the structural walls 128, or a combination thereof as depicted on FIG. 6.

It is further to be noted that alignment aids involve complementary component on the base 140, with one component, e.g., providing a positive component, e.g., a ridge 132 at one position and the complementary component, e.g., the base 140, providing a negative component, e.g., a depression or a clearance at the corresponding position.

Figure 12:
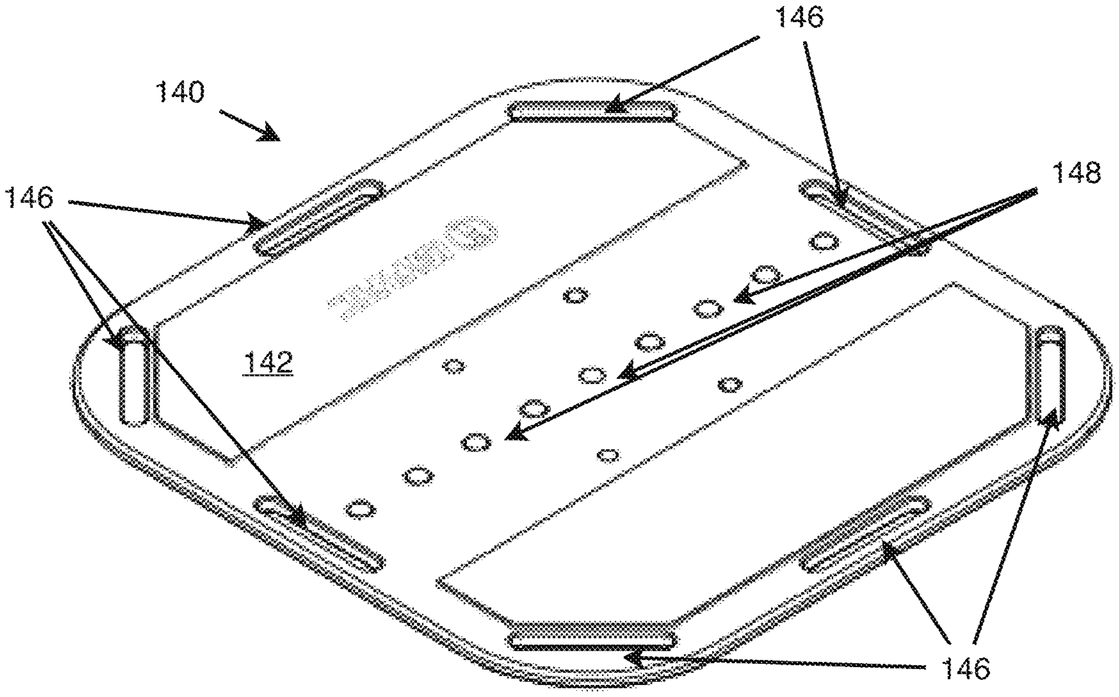
FIG. 12 is a perspective elevation view of the base of the tablet support of FIG. 1.
Figure 13:
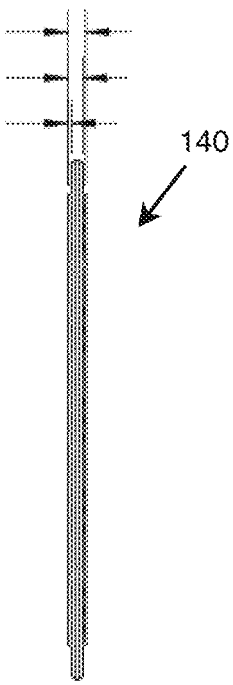
FIG. 13 is a side view of base of FIG. 12.
Figure 14:
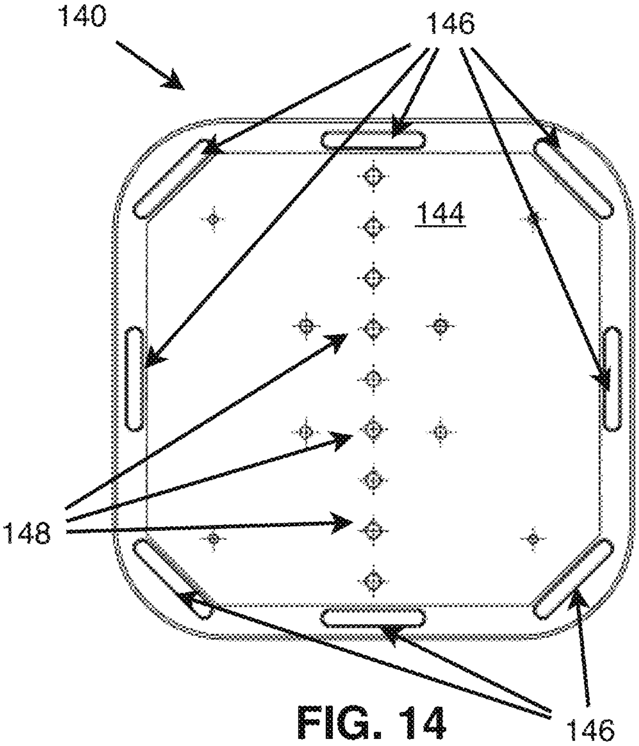
FIG. 14 is an elevation view of the base of FIG. 12.
Figure 15:
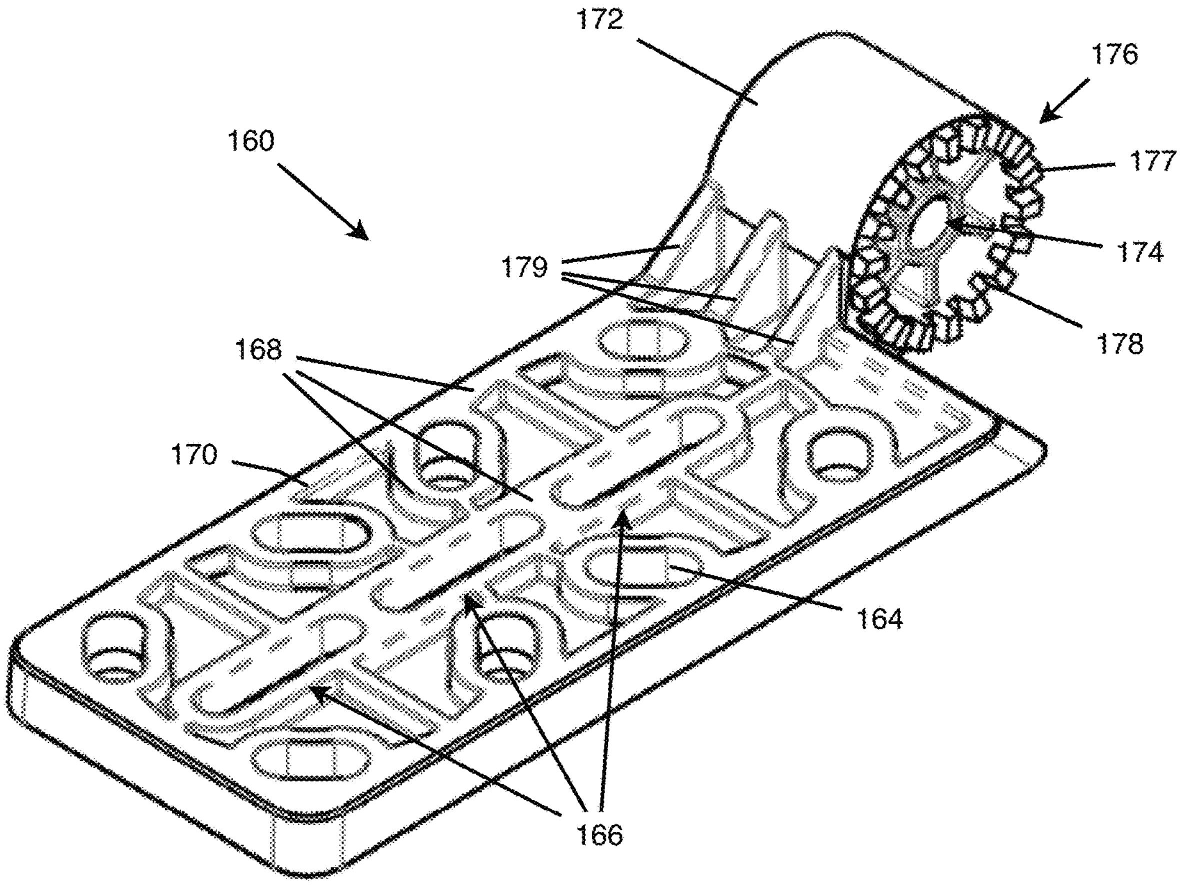
FIG. 15 is a perspective elevation view of a first arm of the tablet support of FIG. 1.
Figure 16:
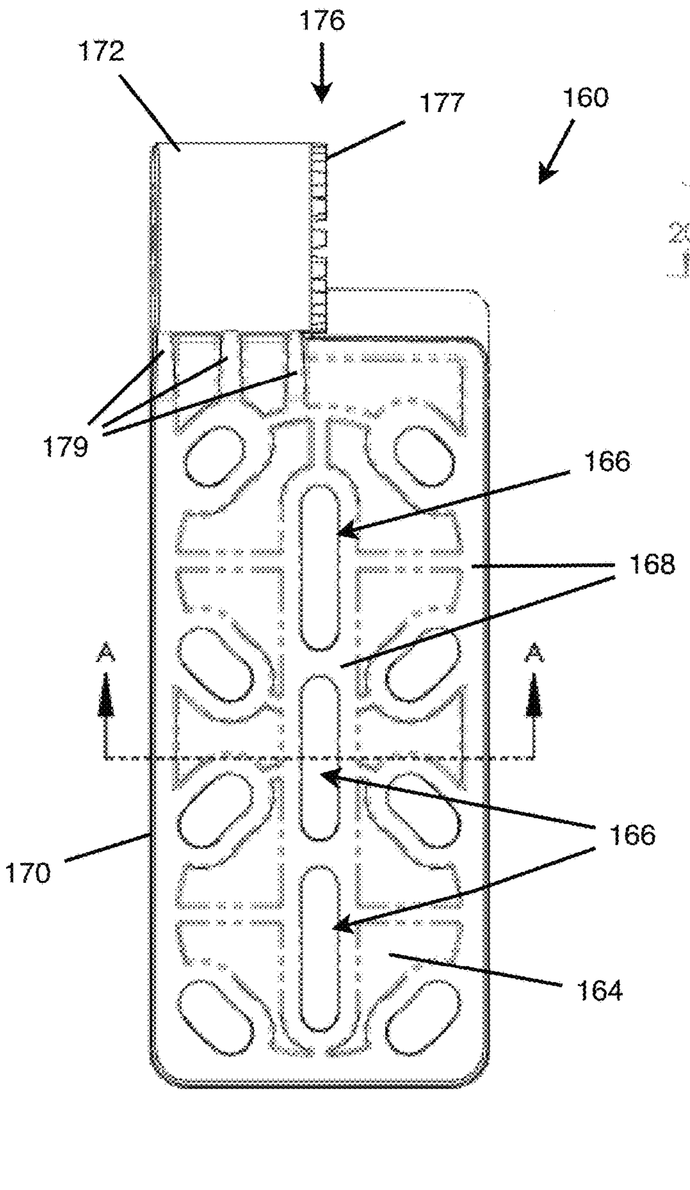
FIG. 16 is an elevation view of the first arm of FIG. 17.
Figure 17:
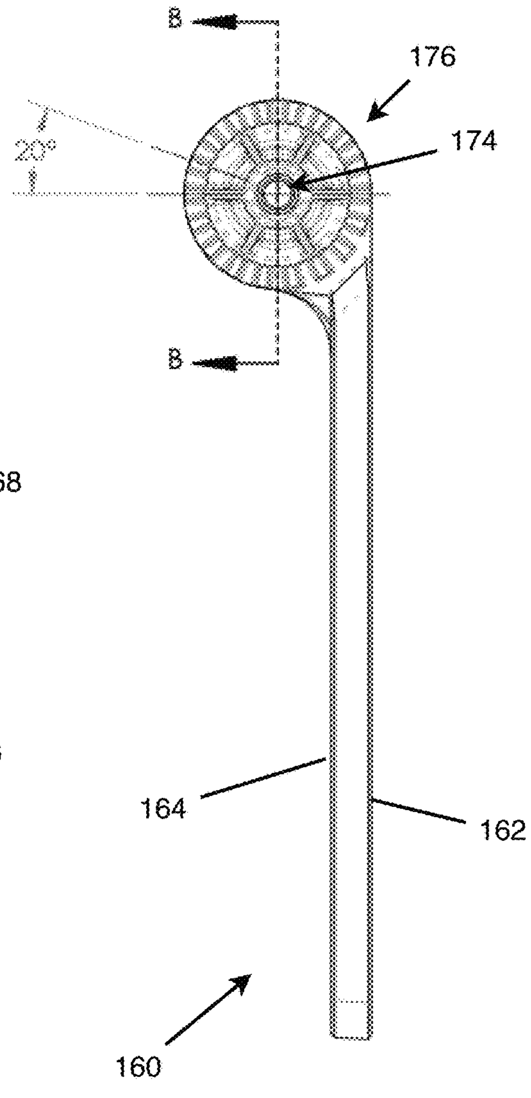
FIG. 17 is a side view of the first arm support of FIG. 17.
Figure 18:
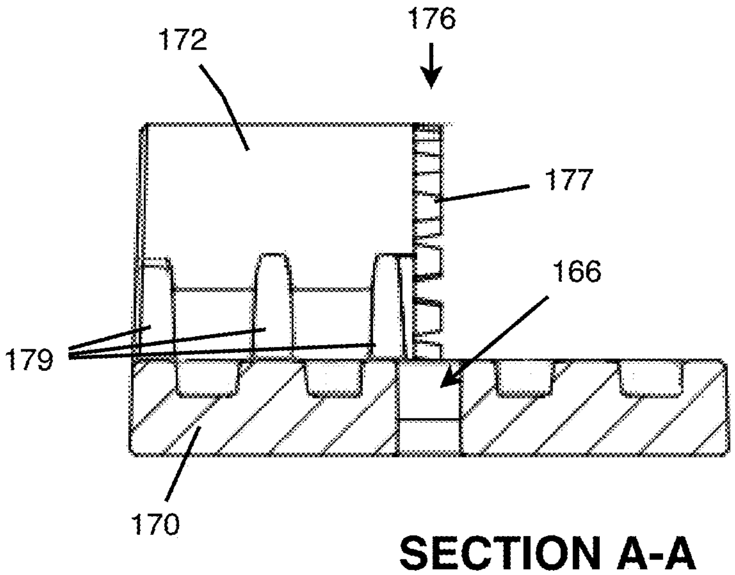
FIG. 18 is a cross-section view of the first arm of FIG. 17 according to the cross-section line A-A depicted on FIG. 16.
Figure 19:
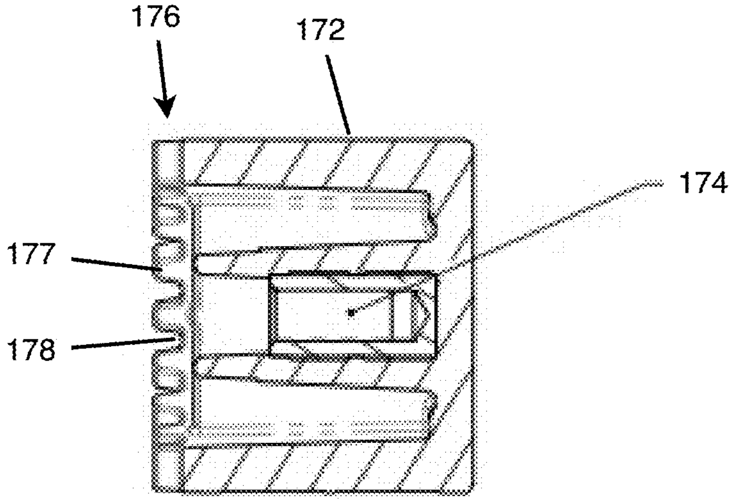
FIG. 19 is a cross-section view of the first arm of FIG. 17 according to the cross-section line B-B depicted on FIG. 17.

Referring now additionally to FIGS. 12 to 14, the base 140 comprises an external face 142 and an internal face 144 which is adapted to be mounted to and facing the pad 120. The base 140 further comprises mounting slots 146 adapted to clip or otherwise secure the base 140 to the pad 120 by inserting and wedging ridges of the pad 120 in the mounting slots 146, or otherwise prevent the base 140 from sliding relative to the pad 120 when appropriately mounted thereto or thereover.

It is worth noting that according to embodiments the base 140 may be mounted in many ways to the pad 120, comprising being screwed, being sled and wedged into grooves, and wedging components of the base 140 over sides of the side wall 124 and/or the structural walls 128 of the pad 120.

According to an embodiment, since the pad 120 is designed to be screwed to e.g., a dashboard, the base 140 needs to be possible to be dismounted to the pad 120. Accordingly, solution of a base 140 that is releasably secured without screws to a pad 120 is elected, with the possibility to pry the base 140 off the pad 120 when needing access to the interior of the pad 120.

The base 140 further comprises threaded holes 148, preferably at least three (3) and up to e.g., nine (9), arranged in an array. The threaded holes 148 are designed to have the adjustment screws 242, 244 screwed therein to mount the articulated arm assembly 155 thereto.

According to an embodiment, the number of holes 148 is at least three (3) arranged in an array, allowing through having the articulated arm assembly 155 mounted using two screws 242, 244 to remain straight, and through using more frontward holes 148 or more rearward holes to mount the articulated arm assembly 155 more frontward or more rearward, thereby proving a first means of adjustment.

Referring now to FIGS. 15 to 19, the first arm 160 of the articulated arm assembly 155 consists in a member 170 having a first, flat, face 162, and an opposed face 164, and a series of oblong holes 166 configured in an array and designed to provide passage to the threaded section of the adjustment screws 242, 244 used to mount the articulated arm assembly 155 to the base 140. In a preferred embodiment, the first arm 160 comprises extended protrusions, hereinafter structural walls 168. adapted to increase rigidity of the first arm 160, including at the locations where the pad of the knobs of adjustment screws 242, 244 are abutting and thus wedging the first arm 160 on top of the base 140.

The first arm 160 further comprises an angular mount 172 adapted to mount the first arm 160 and the second arm 180 to one another. The angular mount 172 comprises a threaded hole 174 adapted to have the threaded section of the adjustment screws 246 screwed therein, and a contact wall 176 comprising a succession of teeth 177 and gaps 178 adapted to grip a similar contact wall 176 of the second arm 180. Structural ridges 179 improve the structural rigidity of the extension of the member 170 into the angular mount 172.

It is worth noting that the shape of the holes 166, namely oblong, and the number of holes, e.g., three (3), considering the use of less, e.g., two (2) adjustment screws 242, 242, allow adjustment in placement of the first arm 160 relative to the base 140. Through the user selecting in which of the holes 166 the adjustment screws 242, 244 are passing, and forward, rearward displacement of the member 170 relative to the base 140, the user may adjust position of the articulated arm assembly 155 more or less frontward.

It is further worth noting that the member 170 and the angular mount 172 provide on the face 162 a face without protrusion, aka a generally virtually flat interface that allows to adjust the location of the first arm 160 relative the base 140 up to a position wherein the angular mount 172 is located above the base 140, and that without the angular mount 172 interfering with the base 140. Thereby, the range of adjustment is maximized.

It is worth noting that the notion of flat interface discussed before refers to the absence of protrusion preventing the angular mount 172 to be positioned on top of the base 140, and not to the face having or not ridges. In case of presence of ridges, the interface is defined by the top of the hindrances, thus the top edges of the ridges and by the external surface of the angular mount 172 which allow a stable contact face to be mounted to the base 140.

Figure 20:
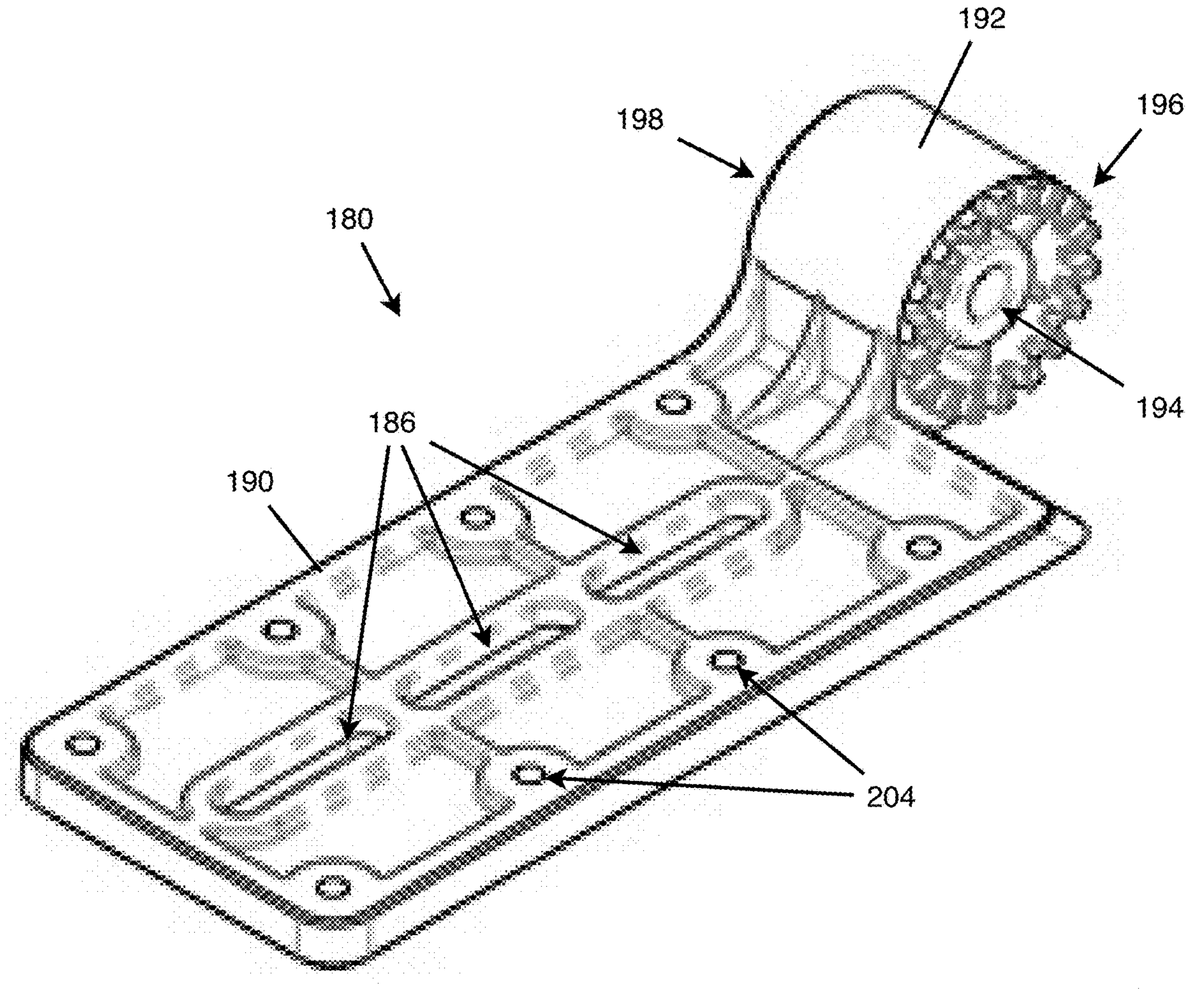
FIG. 20 is a perspective elevation view of a second arm of the support tablet of FIG. 1.

Referring additionally to FIG. 20, the second arm 180 is similar in structure to the first arm 160, namely comprising a member 190 (similar to member 170) and an angular mount 192 (similar to the angular mount 172). The second arm 180 differs from the first arm 160 in the angular mount 192 comprising a non-threaded hole 194 adapted to provide free passage to the threaded section of the extending adjustment screw 246, and an abutment face 198 opposed to the contact wall 196 that is adapted to be abutted by the pad of the knob of the adjustment screw 246 when screwed into the threaded hole 174 of the first arm 160. Thereby, the adjustment screw 246 forces a contact between the contact wall 176 and the contact wall 196, with the complementarity of the teeth and gaps of the contact walls 176, 196 securing the relative angle of the first arm 160 and the second arm 180.

It is worth noting that depending on which orientation the first arm 160 is mounted to the base 140, when the second arm 180 distant to the pad 120 is rotated toward the angular mounts 172, 192, the face of the second arm 180 facing the user is a flat face 182.

Referring to FIG. 20, when centrally mounted, the oblong holes 186 provides room for adjustment of the positioning closer or distant to the angular mounts 172, 192.

According to another embodiment, when side-mounted, holes 204, more numerous than the number of holes necessary to mounting, allow to adjust position between e.g., three position: a) a first position close to the extremity of the first arm 160, b) a second position about in the middle of the first arm 160, and c) a third position close to the angular mounts 172, 192.

Referring now to FIGS. 21 to 25, the tablet interface assembly 195 comprises an interface component 220 having a mushroom shape and comprising a tablet-facing face 222 extending from a generally cylindric wall 224, with at least one of the tablet-facing face 222 and the cylindric wall 224 designed to be secured, permanently such as with glue, or releasably, such as secured with Velcro™, to the tablet or to a tablet holding component, such as jaws-based spring-loaded tablet holder, see FIG. 32.

The interface component 220 comprises opposed thereto a hemispherical wall 226 designed to interface with the arm-mounted interface component 200.

The interface component 220 comprises a hole 228 and a recess to screw the interface component 220 to the arm-mounted interface component 200. The interface component 220 further comprises a non-circular recess 230 designed to interface with a matching protrusion of the arm-mounted interface component 200 for setting the relative orientation of the interface component 220 relative to the arm-mounted interface component 200, e.g., in a portrait mode or landscape mode.

According to a preferred realization, the shape of the recess 230 is either square or octagonal. Alternatively, the protrusion as a square shape, and the recess has an 8-tip star shape adapted to receive the protrusion in orientation 45-degree offset from one another.

According to embodiments, the setting of the matching protrusion in the recess 230 is tight enough to releasably lock the interface component 220 to the arm-mounted interface component 200, with a screw being used only if it is desired to secure the interface component 220 to the arm-mounted interface component 200 with tools being necessary to be dismounted.

Referring additionally to FIGS. 26 to 31, that tablet support 100 is adapted to be mounted, and even more strongly secured, to the dashboard 302 of a vehicle without the need to drill holes or secure screws to the dashboard 302 of the vehicle, thus with no modification or alteration of the vehicle, and to adapt to almost any vehicle. The tablet support 100 is configured such that the pad 120 lays on the dashboard 302, with the base 140 having straps 252 passing through at least two (2) of the mounting slots 146 with hooks 256 mounted to the straps 252 distant to the mounting slots 146 and adapted to hook in existing openings or edges of the vehicle (e.g., an opening of the vent 304 about the windshield 306 of the vehicle, and to the bottom edge of the dashboard 302) such as when tightened, securing the tablet support 100 such that it cannot move.

Figure 26:
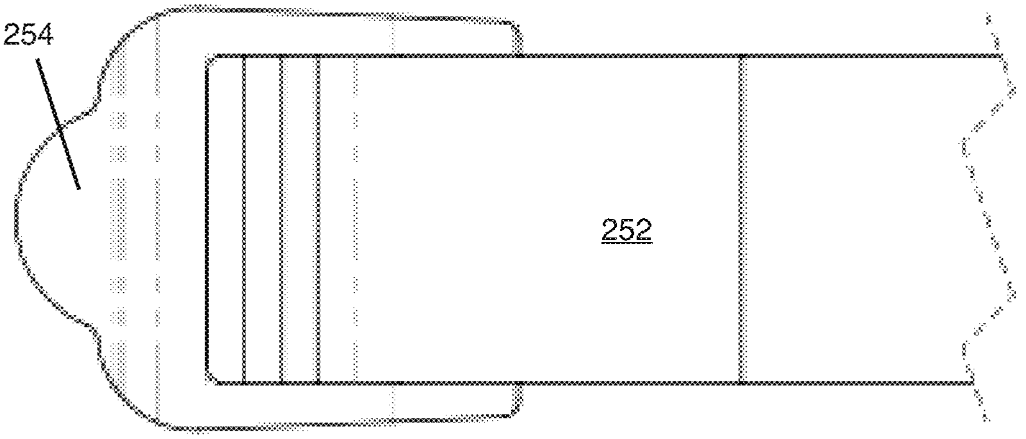
FIG. 26 is a plan view of a buckle with a section of a strap mounted thereto to tighten up the strap retaining the strap and therethrough a tablet support in place in accordance with an embodiment.
Figure 27:
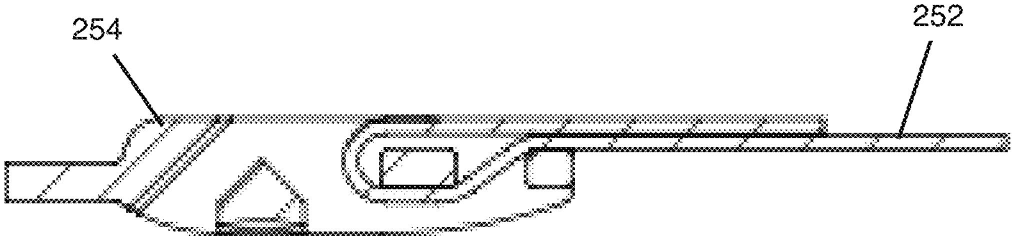
FIG. 27 is a longitudinal side cross-section view of a buckle and a section of a strap mounted thereto in accordance with an embodiment.
Figure 28:
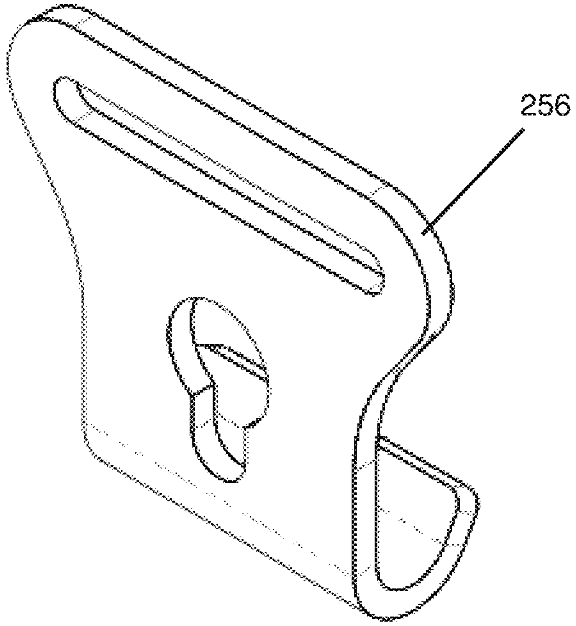
FIG. 28 is a perspective view of a perspective view of a hook mountable to a buckle or a to a strap to hook a table support to a dash of a vehicle.

Referring particularly to FIGS. 26 to 28, the strap 252 passes through a buckle 254 that allows to straighten the strap 252 with the tablet support 100 in position and a hook 256 (mounted either to the strap 252 or to the buckle 254) by pulling e.g., the loose section of the strap 252.

According to embodiments, size and shape of the hook 256 may be adapted to the specific vehicle that the tablet support 100 may be mounted to and to the component to be hooked. The hook 256 may further be finished to prevent friction between hard surfaces that may potentially scratch up surfaces of the dashboard 302.

Figure 29:
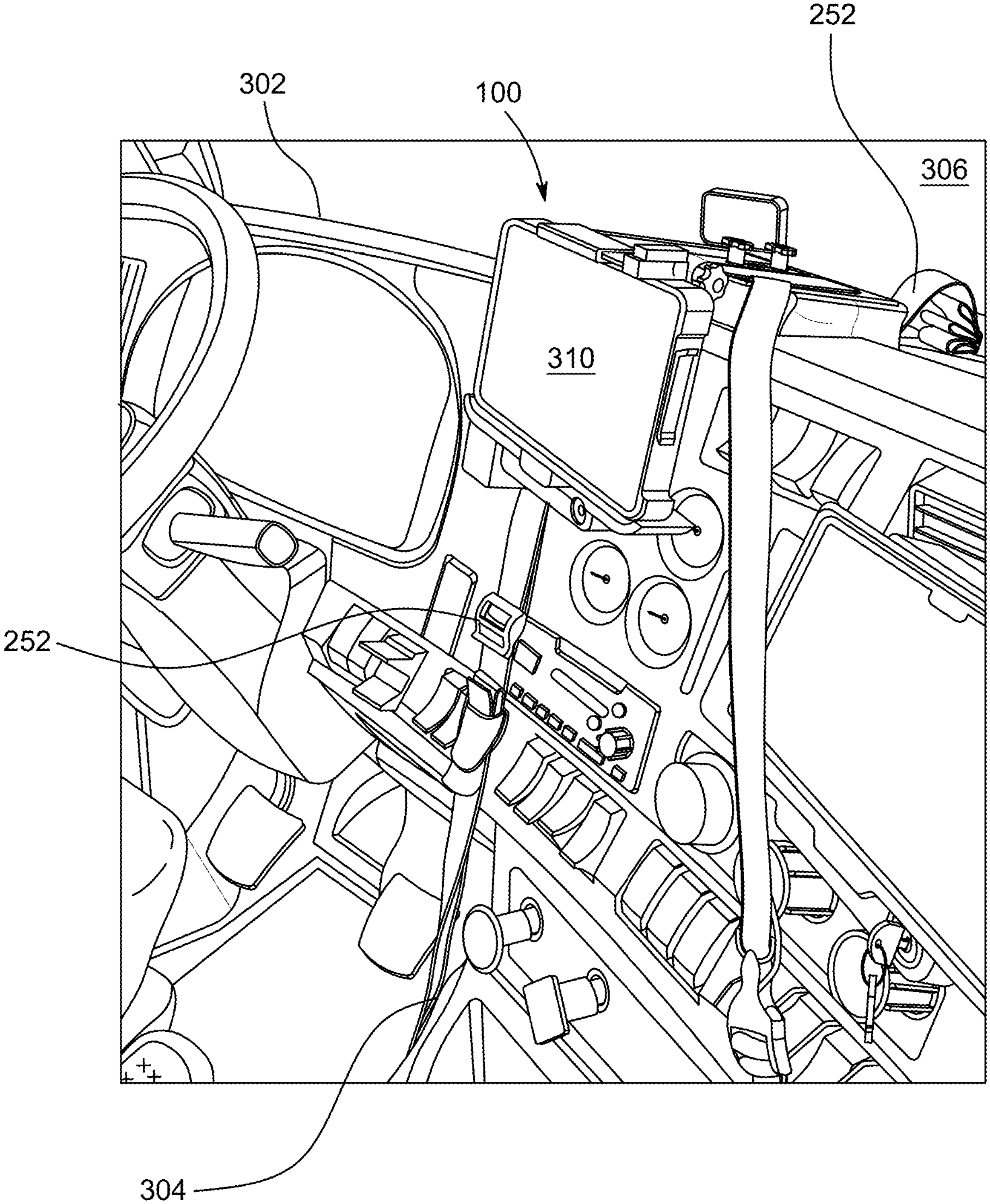
FIG. 29 is a photograph depicting a table support mounted to a dash using a top strap and a bottom strap, and a tablet mounted thereto in a landscape position below and in front of the dash in accordance with an embodiment.
Figure 30:
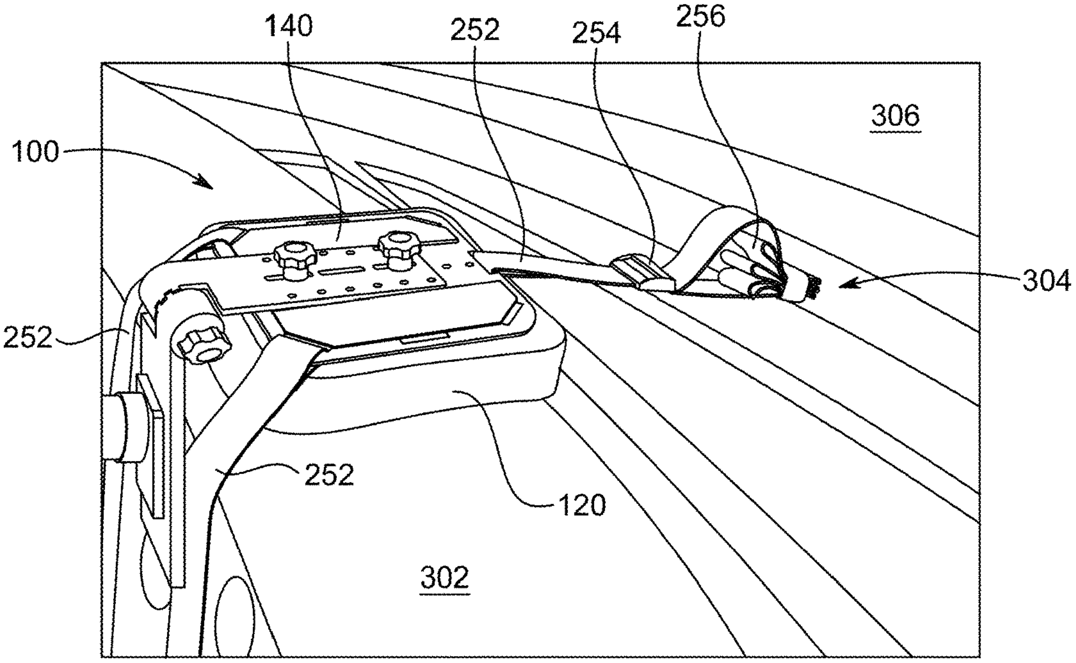
FIG. 30 is a photograph depicting a section of a tablet support mounted to a dash with a first strap hooked about the windshield and two straps extending toward the floor in accordance with an embodiment.
Figure 31:
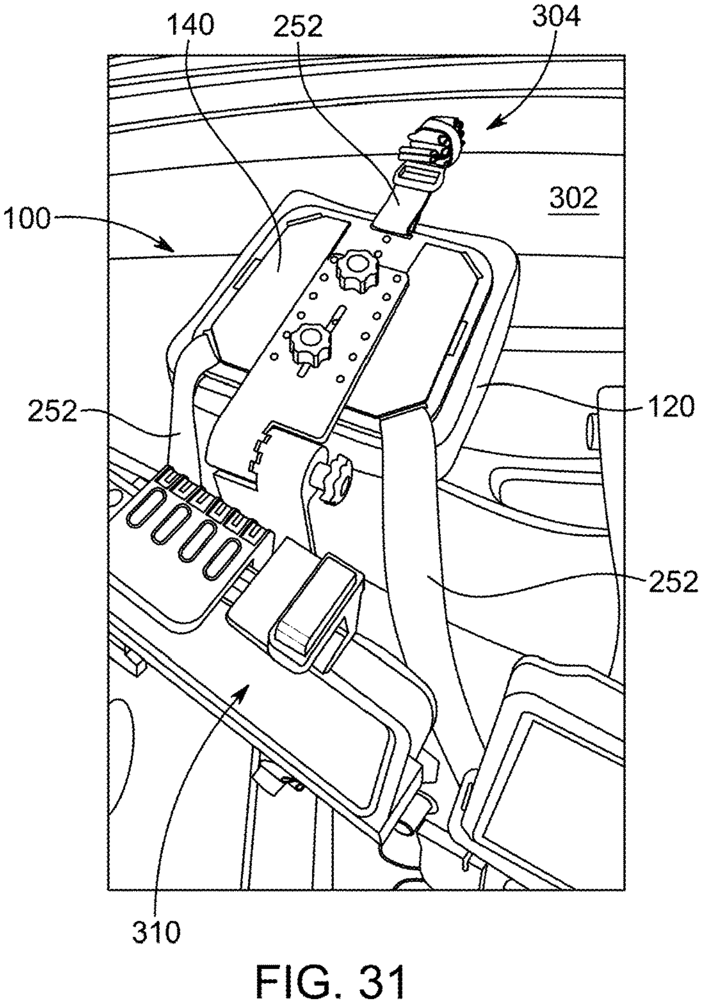
FIG. 31 is a photograph depicting a section of a tablet support mounted to a dash with a first strap hooked about the windshield and a tablet mounted in a landscape orientation in accordance with an embodiment.

Referring particularly to FIGS. 29 to 31, in all configurations, the tablet support 100 is mounted to the top of the dashboard 302 with at least two straps 252 extending in generally opposed direction and tighten to maintain the tablet support 100 in place. When more straps 252 are used at least one extend in a first direction (e.g., the top) and at least two extends generally in the opposed direction (e.g., the bottom) each a little sideways in opposed directions, thus together extending generally in a Y shape, to provide increased sideway stability.

Referring to FIG. 32, a tablet support 100 is mounted on a dashboard 302 of a vehicle. Three straps 252 are hooked to the base 140 and used to tie down the base 140: one to an opening of the vent up front and two to the bottom edge of the dashboard 302. Tension in the straps 252 wedges the pad 120 between the base 140 and the dashboard 302. The articulated arm assembly 155 is mounted to the base 140 frontwards so that the articulation is upfront of the base 140 & pad 120 assembly. The articulated arm assembly 155 is mounted with the appropriate face of the first arm 160 against the base 140 such that when the second arm 180 extends at about 90 degrees relative to the first arm 160 the second arm 180 extends downwards when the interface component 220 is facing away to the base 140. The tablet holding component 260 of the tablet interface assembly 195 is depicted before being mounted to the interface component 220. According to this embodiment, the tablet holding component 260 comprises spring-biased jaws adapted to wedge the tablet (not shown) between a first jaw 262 and a second jaw 264.

It is worth noting that the angle, adjustable with the articulated arm assembly 155, could be decreased down to e.g. 45 degrees, without preventing the tablet support 100 to be operational in at least one of the two positions among extending upwards and extending downwards.

It is worth noting that the present tablet support 100 allows to be mounted to non-flat dashboards (see e.g. FIG. 30 and FIG. 31) and allows to be mounted in a secured fashion without altering the dashboard 302 with screws or alternatives.

Method of mounting the tablet support 100 comprises to place the pad 120 to the desired position on the dashboard 302; mounting the straps 252, buckles 254 and hooks 256 to the base 140; placing the base 140 generally about or on the pad 120, hooking the hook 256; and straitening the straps 252 such as butting up the pad 120 on the dashboard 302. Once the base 140 secured at the appropriate location, the method comprises to secure the base 140 and articulated arm assembly 155 in the desired configuration. Finally, the method comprises to mount the tablet 310 to the distant end of the articulated arm assembly 155. Thereafter, the tablet 310 may be moved and oriented to the preference of the user without having to modify the way the tablet support 100 is secured to the dashboard 302. The tablet 310 may be mounted to be releasable such that the user may easily remove and reinstall the tablet on the tablet support 100.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A tablet support to be mounted on a surface of a vehicle, comprising:

a base;

straps adapted to secure the base to the vehicle; and an articulated arm assembly comprising a first arm, and a second arm articulated relative to one another, with the first arm comprising a first face and a second face, and the second arm comprising a tablet interface assembly;

wherein the articulated arm assembly is adapted to be mounted to the base either with its first face or its second face against the base, wherein, by securing the first face or the second face of the first arm to the base, the tablet interface assembly can be positioned in a first position or in a second position while facing away to the base, and wherein the articulated arm assembly comprises a pair of contact walls interfacing rotatably with one another, and means to releasably exert pressure that wedges the contact walls against one another, thereby adapted to set the contact walls in a plurality of angular positions relative to one another.

2. The tablet support of claim 1, further comprising a pad, wherein the straps are adapted to secure the base on top of the pad, thereby having the pad wedged between the base and the surface.

3. The tablet support of claim 1, wherein an interface between the first face and the base defines a first plane, and wherein the articulated arm assembly comprises an articulation axis around which rotates the second arm that is parallel to the first plane.

4. The tablet support of claim 1, wherein the contact walls comprise teeth and recesses.

5. The tablet support of claim 1, wherein the first arm is adapted to be mounted to the base by securing the first arm to the base using a releasable securing means.

6. The tablet support of claim 1, wherein the first arm is adapted to be mounted to the base in a plurality of positions regardless of which one of the first face and the second face of the first arm is mounted against the base.

7. The tablet support of claim 1, wherein the tablet interface assembly comprises an interface component mounted to the second arm and a tablet holding component adapted to hold a tablet, the tablet interface assembly comprising a protrusion and a recess that are adapted to be combined to releasably mount the tablet holding component to the interface component.

8. The tablet support of claim 7, wherein the protrusion has a non-circular first shape, and the recess has a second shape that allows to insert the protrusion in the recess in a plurality of positions.

9. The tablet support of claim 1, where the base comprises a plurality of slots, wherein at least one of the straps comprise a hook adapted to be inserted in one of the slots.

10. A tablet support to be mounted on a surface of a vehicle, comprising:

a base;

straps adapted to secure the base to the vehicle; and an arm assembly comprising a first arm and a second arm that are adapted to be in a first position in which the first arm and the second arm have a first angle greater than 45 degrees in-between, with the first arm comprising a first face and a second face, and the second arm comprising a tablet interface assembly;

wherein the arm assembly is adapted to be mounted to the base either with its first face or its second face against the base, thereby adjusting position of the tablet interface assembly relative to the base, and wherein the tablet interface assembly comprises an interface component mounted to the second arm and a tablet holding component adapted to hold a tablet, the tablet interface assembly comprising a protrusion and a recess that are adapted to be combined to releasably mount the tablet holding component to the interface component.

11. The tablet support of claim 10, further comprising a pad, wherein the straps are adapted to secure the base on top of the pad, thereby having the pad wedged between the base and the surface.

12. The tablet support of claim 10, wherein the arm assembly is an articulated arm assembly that comprises an articulation axis around which rotates the second arm, wherein the second arm as an end distant to the articulation axis allowing, wherein the end is adapted to be moved between a first position and a second position closer to the base than the first position.

13. The tablet support of claim 12, wherein the articulated arm assembly comprises a pair of contact walls interfacing rotatably with one another, and means to releasably exert pressure that wedges the contact walls against one another, thereby adapted to set the contact walls in a plurality of angular positions relative to one another.

14. The tablet support of claim 13, wherein the contact walls comprise teeth and recesses.

15. The tablet support of claim 10, wherein the first arm is adapted to be mounted to the base by securing the first arm to the base using a releasable securing means.

16. The tablet support of claim 10, wherein the first arm is adapted to be mounted to the base in a plurality of positions regardless of which one of the first face and the second face of the first arm being mounted against the base.

17. The tablet support of claim 10, wherein the protrusion has a non-circular first shape, and the recess has a second shape that allows to insert the protrusion in the recess in a plurality of positions.

18. The tablet support of claim 10, where the base comprises a plurality of slots, wherein at least one of the straps comprise a hook adapted to be inserted in one of the slots.

19. A tablet support to be mounted on a surface of a vehicle, comprising:

a base;

straps adapted to secure the base to the vehicle; and an articulated arm assembly comprising a first arm, and a second arm articulated relative to one another, with the first arm comprising a first face and a second face, and the second arm comprising a tablet interface assembly;

wherein the articulated arm assembly is adapted to be mounted to the base either with its first face or its second face against the base, and wherein, by securing the first face or the second face of the first arm to the base, the tablet interface assembly can be positioned in a first position or in a second position while facing away to the base, wherein the tablet interface assembly comprises an interface component mounted to the second arm and a tablet holding component adapted to hold a tablet, the tablet interface assembly comprising a protrusion and a recess that are adapted to be combined to releasably mount the tablet holding component to the interface component.

20. The tablet support of claim 19, wherein the protrusion has a non-circular first shape, and the recess has a second shape that allows to insert the protrusion in the recess in a plurality of positions.

* * * * *